United States Patent [19]

Luniewski

[11] Patent Number: 5,296,113
[45] Date of Patent: * Mar. 22, 1994

[54] IRRADIATION DEVICE FOR FLUOROPOLYMERS

[76] Inventor: Robert S. Luniewski, 14 Maureen Dr., Smithtown, N.Y. 11787

[*] Notice: The portion of the term of this patent subsequent to Sep. 22, 2009 has been disclaimed.

[21] Appl. No.: 947,423

[22] Filed: Sep. 18, 1992

Related U.S. Application Data

[63] Continuation-in-part of Ser. No. 485,284, Feb. 26, 1990, Pat. No. 5,149,727.

[51] Int. Cl.⁵ ............................. C07C 7/00; C08J 3/00
[52] U.S. Cl. .......................... 204/157.15; 204/157.44; 241/79.1; 209/133
[58] Field of Search ................ 204/157.15, 157.44; 522/156; 241/79.1, 79; 209/133

[56] References Cited

U.S. PATENT DOCUMENTS

| | | | |
|---|---|---|---|
| 3,434,593 | 3/1969 | Sullivan | 209/31 |
| 3,718,819 | 2/1973 | Miksitz | 250/43.5 D |
| 4,220,511 | 9/1980 | Derbyshire | 204/159.2 |
| 4,777,192 | 10/1988 | Neuberg et al. | 522/156 |
| 5,149,727 | 9/1992 | Luniewski | 522/156 |

*Primary Examiner*—John Niebling
*Assistant Examiner*—Arun S. Phasge
*Attorney, Agent, or Firm*—Lieberman & Nowak

[57] ABSTRACT

An apparatus and method for irradiating PTFE particles to cause them to disintegrate into a powder includes a chamber into which the particles are fed continuously. The particles are simultaneously agitated using only air, irradiated with a beam of electrons and pulverized. The powder produced thereby is extracted using an air classifier.

12 Claims, 1 Drawing Sheet

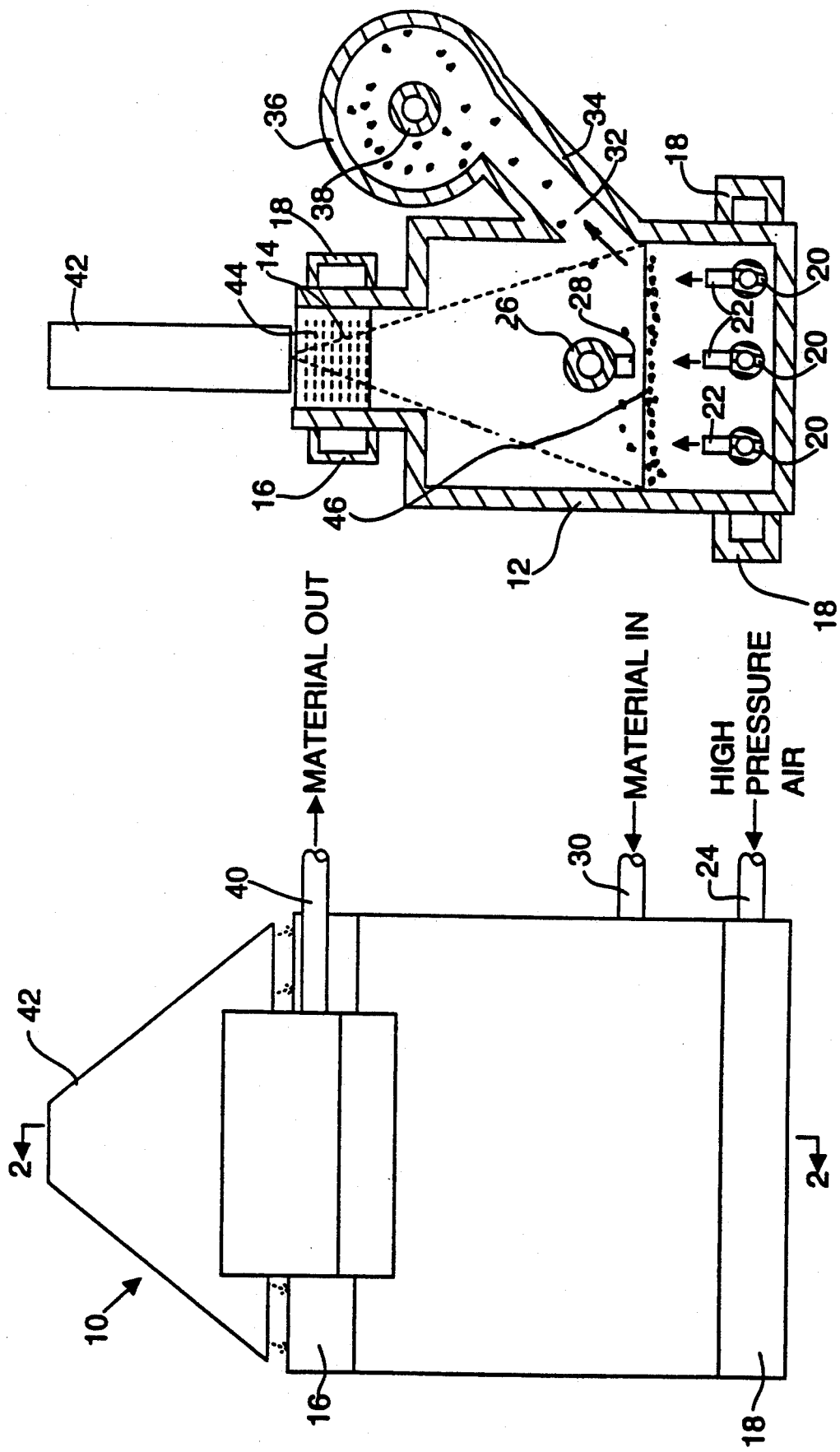

IRRADIATION DEVICE FOR FLUOROPOLYMERS

BACKGROUND OF THE INVENTION

Related Applications: This is a continuation-in-part to application Ser. No. 485,284, filed on Feb. 26, 1990, now U.S. Pat. No. 5,149,727.

FIELD OF THE INVENTION

This invention relates to the use of electron irradiation and grinding along with an air classifier for the degradation of fluoropolymers, particularly polytetrafluoroethylene, to a uniform size and reduced molecular weight.

DESCRIPTION OF THE PRIOR ART

It is well-known in the prior art to use electron irradiation to degrade polytetrafluoroethylene (PTFE) so as to reduce its molecular weight resulting in a fine particle powder for use as a dry lubricant in paints and ink. The degradation reaction is dependent on the availability of oxygen at the molecular level.

An early example of such a process is disclosed in U.S. Pat. No. 3,766,031 to Dillon wherein PTFE was exposed to electron irradiation. This process, however, was deficient in that there was no cooling apparatus and the PTFE was not irradiated uniformly.

The irradiation processes of the early prior art which irradiated the PTFE in trays were inefficient due to overscan of the trays, the gaps between the trays and the penetration characteristics of an electron beam. That is, the need to assure complete and uniform irradiation of a tray requires some overscan by the radiation and an efficiency loss of 5 to 15%. Likewise, there is usually some space between the trays of material which causes a further 10 to 15% loss of efficiency. However, the largest efficiency loss arises out of the fact that the dose received by the material varies with material depth. Typically, the dose at the surface is taken as the nominal dose for the material. Beam energy and/or material depth is adjusted so that an equal dose is effected at the opposite surface of the material. Radiation which passes entirely through the product is not utilized. Radiation in excess of the nominal dose is likewise not used. This causes further inefficiency, and in some instances may result in undesired properties of the resultant product. This depth-dose characteristic can cause processing inefficiency of up to 50%.

U.S. Pat. Nos. 4,748,005 and 4,777,192 issued to Neuberg and the instant inventor discloses water cooling, either with a water jacket or by direct spraying onto the PTFE, during electron irradiation of a selected portion of the PTFE while in a processing vessel. These processes result in a uniformly irradiated product. However, the uniformly irradiated product is of poor quality in that the resulting powder particles are of widely varying sizes and is not cost effective in that particles which are mechanically comminuted to a small size need less radiation than do other particles. Larger particles receive less oxygen affecting their core.

These references are designed for batch operation, which adds to the energy and economical inefficiency. Moreover, these references use a ribbon blender which requires large energy expenditures. Further, the apparatus of these references tended to fluidize PTFE. Additionally, the use of direct water cooling prevents proper degradation of the PTFE resulting in an inferior product. The use of direct water cooling also results in a great quantity of waste steam which contains fluorine gas, which combines with water to form hydrofluoric acid. Similarly, the use of a water jacket requires water at a temperature which is above the dew point of the surrounding air to avoid condensation. This may lead to the use of large quantities of water at elevated temperatures, and even the use of a water-to-water heat exchanger which adds to the complexity of the apparatus.

OBJECTIVE AND SUMMARY OF THE INVENTION

In view of the above-mentioned disadvantages of the prior art, it is an objective of this invention to degrade fluoropolymers, especially polytetrafluoroethylene, by the simultaneous electron irradiation and grinding to produce polytetrafluoroethylene particles of reduced molecular weight within a preselected size range.

A further objective of this invention to use energy efficiently, both in the efficient use of the electron beam and in the means of physical agitation of the PTFE.

Yet another objective of the invention is to provide an apparatus in which more uniform oxygenation is applied to the PTFE particles.

Yet another objective is to use air cooling, rather than water cooling, during the irradiation process.

These and other objects are effectively attained by providing an apparatus and method using air currents within an irradiation and grinding vessel to agitate the PTFE stock in a haphazard random manner, passing at least a portion of the PTFE through the zone of irradiation of an electron beam. A high pressure air manifold is provided at the bottom of the irradiation and grinding vessel to effect grinding simultaneously with the irradiation. An air classifier balances centrifugal force and air drag to extract particles from the processing container within a pre-selected diameter range on the order of 10–400 microns (depending on the desired properties) and within a corresponding pre-selected molecular weight range.

Therefore, an apparatus and method are provided for the reduction of particle size and molecular weight by simultaneous grinding and irradiation of fluoropolymers such as PTFE for use as a dry lubricant.

This apparatus and method are energy efficient in that the electron irradiation is essentially completely absorbed in the PTFE, and no particles continue to receive irradiation after being extracted by the air classifier due to their desired size and corresponding molecular weight. Similarly, this apparatus and method are energy efficient in that air currents are used for agitation rather than a high speed ribbon blender thereby reducing mechanical complexity. This apparatus and method are economically efficient in that it is not constrained to batch operation and can have a continuous feed.

The product produced by this method and apparatus is superior due to the uniform size and molecular weight of the resultant particles and due to the lack of water cooling.

BRIEF DESCRIPTION OF THE DRAWINGS

FIG. 1 shows a somewhat schematic elevational view of a device constructed in accordance with this invention; and FIG. 2 shows an elevational cross-sectional view, of the device of FIG. 1.

DETAILED DESCRIPTION OF THE INVENTION

Referring now to the drawings, a device 10 constructed in accordance with this invention consists of a generally rectangular chamber 12. At the top, the chamber 12 is provided with an aperture 14 running through the length of chamber 12 and formed of a transparent material. The aperture and the bottom of the chamber 12 are cooled by water through cooling jackets 16, 18 (the source of cooling water to these jackets has been omitted for the sake of clarity).

One or more supply pipes 20 runs through the length of the chamber 12 and is provided with nozzles 22. Pipes 20 are coupled to an external pipe 24 which supplies heated air at high pressure sufficient to fluidize particles as described below.

A further pipe 26 is also located within chamber 12. Pipe 26 runs through the length of the chamber and is disposed in a middle region thereof as best seen in FIG. 2. Pipe 26 is provided with nozzles 28 and is connected to an external pipe 30 which provides a continuous supply of material to be irradiated.

One of the sidewalls of the chamber 12, for example sidewall 32 is provided with a horizontal elongated slot 32. A manifold 34 leads from slot 32 to a cylindrical air classifier 36. A collection pipe 38 is disposed axially within the classifier 36 and is coupled to an external pipe 40.

Above chamber 12, there is provided an electron beam supply 42 which generates a beam 44 directed toward chamber 12. Preferably the beam 44 is fan-shaped (as shown in FIG. 2) so that the beam propagates into the chamber through aperture 14 with minimal losses. Chamber 12 may also include a lens, preferably substantially coextensive with aperture 14, to focus beam 44. The beam is scanned by the supply 42 longitudinally along the entire length of chamber 12 thereby continuously irradiating the particles contained therein. Alternate radiation sources may also be used such as cobalt 60.

The device operates as follows. Material for irradiation, for example, in the form of PTFE particles 46, is continuously introduced into the chamber 12 at a rate of 400–1000 pounds per hour through pipes 30 and 26. Once inside the chamber 12, the particles 46 are found into a fluidized bed under pipe 26 by jets of heated air issuing from nozzles 22. As they circulate within the bed, these particles are exposed to beam 44 and hence are bombarded by the electrons. At any given time over 99% of the particles are within the area of the beam 44. At the same time, the particles also grind against each other. The simultaneous grinding of the particles and the electron bombardment in the presence of oxygen causes the particles to break up into a powder of much smaller size and lower molecular weight. The powder migrates through the manifold 34 into the separator 36. Within the separator particles having a pre-selected diameter are exhausted through pipe 38. The radiation dosage received by each particle injected into the chamber is not important for the present apparatus. The objective is to break down the particles until powder having a preselected nominal size is obtained. The degradation of the particles takes place in a short period of time and therefore the PTFE particles are not affected by the cooling water in jacket 18. The purpose of this jacket is to cool the chamber 12 itself, not the particles. The whole process is operated continuously.

Obviously numerous modifications may be made to the invention without departing from its scope as defined in the appended claims.

I claim:

1. An apparatus for degrading particulate matter made of complex molecules, said apparatus comprising:
   a closed chamber having an aperture;
   particle injection means for injecting particle into said chamber;
   air injection means for injecting air in said chamber, said air injection means being constructed and arranged for creating a fluidized bed of said particles, so that said particles are ground against each other;
   an electron source directing an electron beam through said aperture intersecting said path;
   wherein said particles are degraded into a powder by the simultaneous action of said electron beam and the grinding wherein said particles are degraded into a powder; and
   collector means coupled to said chamber for collecting said powder.

2. The apparatus of claim 1 wherein said chamber has a lens and said aperture is substantially coextensive with said lens.

3. The apparatus of claim 1 wherein said collector means comprises a classifier.

4. The apparatus of claim 1 wherein said particles are made of PTFE.

5. An apparatus for irradiating fluoropolymers comprising:
   a chamber having a length and an aperture substantially coextensive with said length;
   a supply pipe disposed in said chamber and substantially coextensive with said aperture and arranged to supply particles of fluoropolymers into said chamber;
   air agitation means consisting of an air supply arranged to grind said particles in a fluidized bed in said chamber;
   a source of electrons arranged to direct a beam of electrons through said aperture to bombard said particles wherein under the influence of said agitation and said electron bombardment said particles disintegrate into a powder; and
   powder collection means for continuously collecting said powder from said chamber.

6. The apparatus of claim 5 wherein said chamber includes a slot and said collection means comprises an air classifier in communication with said chamber through said slot.

7. The apparatus of claim 5 wherein said agitation means comprises an air pipe substantially coextensive with and parallel to said supply pipe, said air pipe being arranged to direct air through said chamber to blow said particles.

8. The apparatus of claim 7 wherein path of said particles and said electron beam intersect.

9. The apparatus of claim 7 wherein said electron beam scans said chamber along a longitudinal axis.

10. A method of irradiating fluoropolymer particles comprising the steps of:
    supplying continuously fluoropolymer particles into a chamber;
    agitating said particles using air from an air supply causing said particles to grind against each other;
    irradiating the agitated particles with a beam of electrons causing said particles to disintegrate into a powder; and
    collecting said powder continuously form said chamber.

11. The method of claim 10 wherein said particles are formed by said air into a fluidized bed.

12. The method of claim 11 wherein said electron beam scans said fluidized bed.

* * * * *